United States Patent
Hayes

[15] 3,647,236
[45] Mar. 7, 1972

[54] HANDTRUCK ATTACHMENT

[72] Inventor: Leonard L. Hayes, 5060 Mitchell St., Riverside, Calif. 92505

[22] Filed: Mar. 9, 1970

[21] Appl. No.: 18,405

[52] U.S. Cl. .........................280/41 R, 280/47.2, 280/47.27
[51] Int. Cl. ................................................B62b 1/08
[58] Field of Search ...............280/47.2, 47.27, 47.28, 47.29, 280/41 R

[56] References Cited

UNITED STATES PATENTS

| | | | |
|---|---|---|---|
| 2,770,310 | 11/1956 | Gates | 280/47.27 X |
| 2,361,674 | 10/1944 | Zeindler | 280/47.34 X |
| 1,308,934 | 7/1919 | Chesnutt | 280/47.2 UX |

FOREIGN PATENTS OR APPLICATIONS

| | | | |
|---|---|---|---|
| 531,830 | 8/1955 | Italy | 280/47.2 |
| 1,043,136 | 6/1953 | France | 280/47.2 |

*Primary Examiner*—Benjamin Hersh
*Assistant Examiner*—Leslie J. Paperner
*Attorney*—Peter H. Firsht and John H. Crowe

[57] ABSTRACT

A handtruck body has a front end mounted on an axle and a pair of wheels about which the body is tilted for handling a load. An attachment has a front end pivotally connectable to the axle, a wheeled rear end and transversely slideable members having upstanding projections. The attachment is adapted to fit wholly within the body and be retained therein, yet can be released to swing downwardly and the projections can be foot manipulated for sliding the members laterally for engagement under the body to support it in tilted position.

7 Claims, 5 Drawing Figures

PATENTED MAR 7 1972 3,647,236
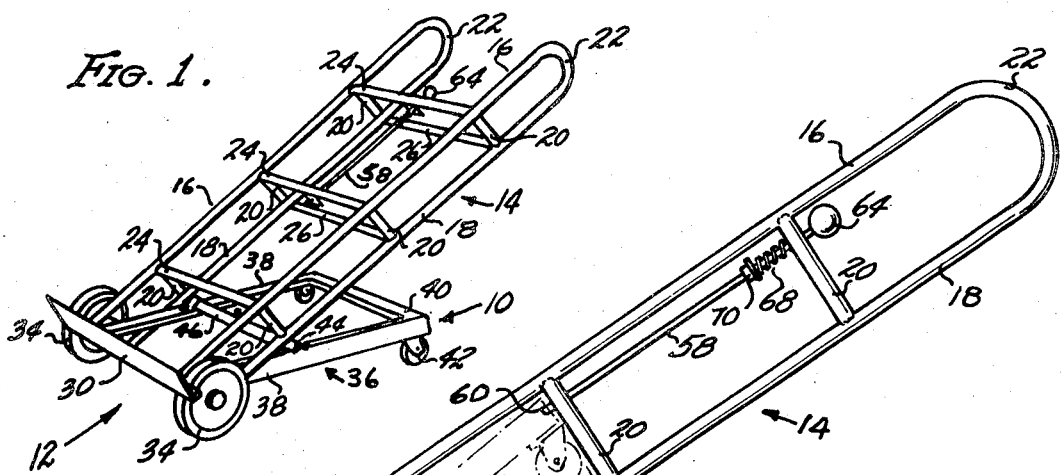
FIG. 1.
FIG. 2.
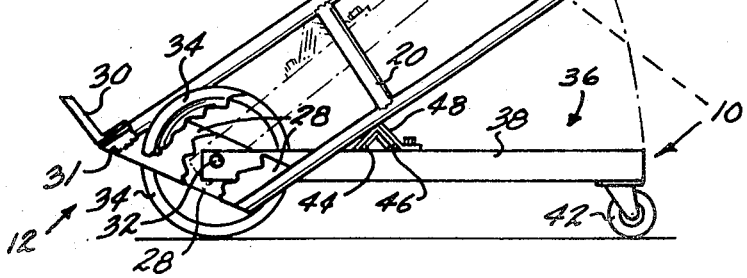
FIG. 4.
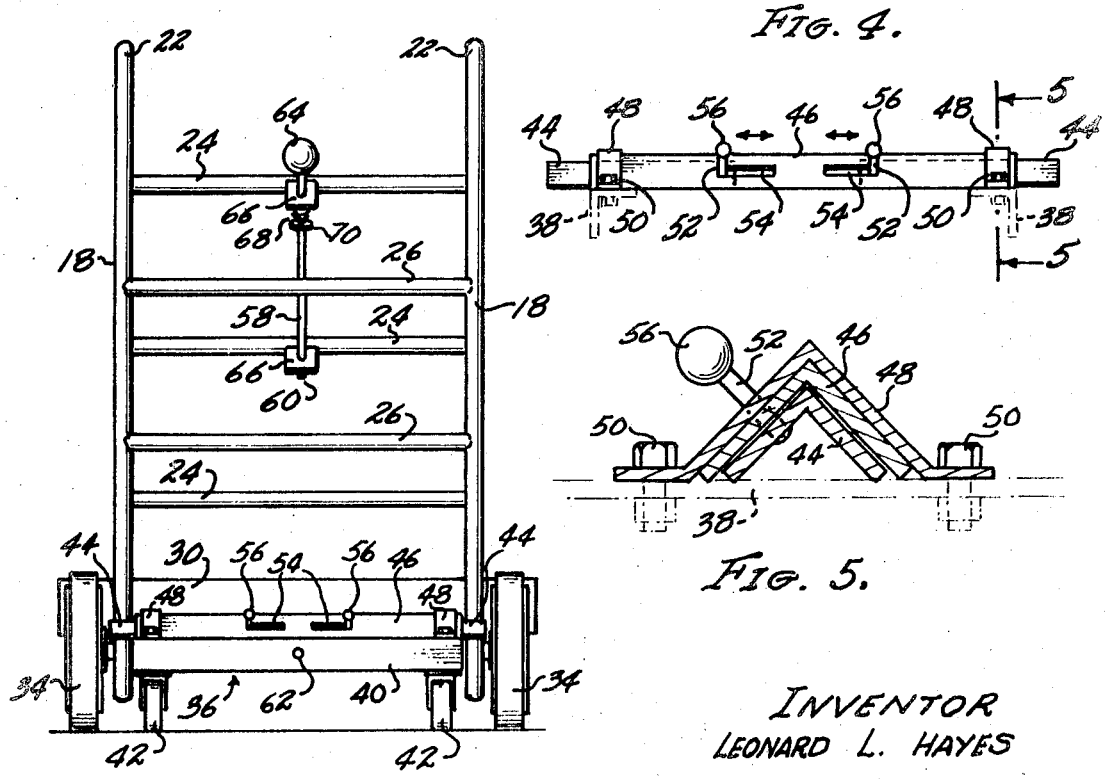
FIG. 3.
FIG. 5.
INVENTOR
LEONARD L. HAYES
BY Peter H. Firsht
Attorney

HANDTRUCK ATTACHMENT

BACKGROUND OF THE INVENTION

The present invention relates to handtrucks, and more particularly to an attachment which can be connected to any one of a variety of handtrucks for increasing the stability of the handtruck, thus improving the safety thereof, and relieving the operator of considerable strain, where heavy loads are handled.

Conventional handtrucks are ordinarily constructed with a body having a toe piece and carrying wheels at its front end and handles at the rear thereof by which the body is manipulated for tilting about the axis of the wheels to engage the toe piece under a load and eventual support of the load on the body, in a manner well known to those skilled in the art. The transport of the load is then accomplished by the operator of the handtruck pulling or pushing on the handles to move the load in the desired direction. This, of course, requires that the operator support a portion of the vertical component of the load, which imposes a strain on the muscles of the operator, additional to the strain imposed thereon in moving the load across the ground.

To minimize the strain on the operator, many forms of attachments have been proposed which have not proved entirely satisfactory because they are complex in construction, cumbersome in operation, and costly to construct.

SUMMARY OF THE INVENTION

It is therefore a primary purpose of the present invention to provide an attachment for a handtruck which is of simple and economical construction and operates in an easy and reliable manner to provide a compact lightweight wheeled support enabling the transportation of heavy loads considerable distances with comparative safety and a minimum of effort and strain on the part of the operator, yet can be disposed wholly within the body of the handtruck for use of the latter in the ordinary manner.

Accordingly, the present invention provides an attachment for a handtruck, the attachment including a frame with a wheeled rear end and a front end pivotally connectable to the handtruck. The attachment frame is dimensioned so that it can fit wholly within the handtruck body and be retained therein by a spring-pressed plunger engageable with the attachment frame and mounted on the body for easy access and manipulation by the operator of the handtruck. Withdrawal of the plunger permits the frame to swing downwardly so that the wheeled rear end thereof engages the ground. Transversely aligned angle members are mounted on the frame for sliding between retracted positions permitting fitting of the frame within the handtruck body, and laterally extended positions in which the end portions of the angle members engage under the body for supporting it in a tilted position for easy transport of a load thereon. The frame can have one or two wheels, preferably of the caster type, for easy and safe transport of the load on the body. The angle members are provided with upstanding projections which can be manipulated by hand or foot for extension or retraction of the members.

The attachment of the present invention is of simple construction and relatively inexpensive to construct and has the advantage that it can be disposed or nested within the handtruck body, permitting use of the handtruck in the ordinary manner, yet providing that the attachment frame can be swung downwardly, merely by release of the retaining plunger, permitting the rear end of the attachment to gravitate to the ground, and the angle iron members can be easily manipulated with the operator's foot for readily supporting the body in a safe tilted position without strain on the operator and involving only a minimum of effort and danger on his part in transporting heavy loads considerable distances.

BRIEF DESCRIPTION OF THE DRAWINGS:

FIG. 1 is a perspective view of a handtruck having an attachment embodying the principles of the present invention connected thereto and cooperating therewith to support and transport a heavy load.

FIG. 2 is an enlarged side elevational view of the handtruck and attachment, with parts broken away.

FIG. 3 is a rear elevational view of the handtruck and attachment of FIG. 2.

FIG. 4 is a rear elevational view, on a slightly larger scale and partly in section, of the slideable angle members which are adapted to engage under the handtruck body for supporting it in a tilted position.

FIG. 5 is a larger scale, cross-sectional view on line 5—5 of FIG. 4.

DESCRIPTION OF EMBODIMENT

Referring to the drawings, there is shown in FIG. 1 an attachment 10 embodying the principles of the present invention which is connected to a handtruck 12 of conventional form and cooperates therewith to support a load for easy transport. The handtruck is preferably of the type having a load-supporting body 14 with vertically disposed side portions made up of longitudinally extending tubular sidepieces 16 and 18 interconnected by tubular struts 20, longitudinally spaced as shown in FIGS. 1 and 2. The rear ends of the sidepieces are joined together to provide handles 22. The upper sidepieces 16 are interconnected by tubular crosspieces 24, best seen in FIG. 3, to form a load-supporting bed. The crosspieces are preferably joined to the sidepieces in line with the struts. Tubular crosspieces 26 are similarly joined to the lower sidepieces 18, except that there is no crosspiece at the lower ends of the forwardmost pair of struts, for a purpose later appearing. At their front ends, the sidepieces 16 and 18 are interconnected by a pair of vertically disposed mounting plates 28 and a transversely extending toe plate 30. The toe plate is angular and at its ends has angle pieces 31 which are fixed thereto and to the sidepieces 16, as by welding or the like. There is thus provided a load-supporting body which is relatively light and strong.

Received through the mounting plates 28 is a transverse axle 32 on the outer ends of which a pair of ground-engaging wheels 34 are mounted. By manipulating the handles 22, the body 14 can be tilted about the axle for working the toe plate 30 under a load and eventual support of the load on the body, in a manner well known to experienced operators of handtrucks.

The attachment 10 of the present invention consists essentially of a wheeled frame 36 having side members 38 and an interconnecting rear member 40. The frame members are preferably made of angle irons or other structural material to provide a frame which is relatively light, strong and economical to produce. The front ends of the side members are pivotally connected to the axle 32 in any suitable manner. Preferably, the side members are transversely spaced so that the attachment frame fits closely within the body sidepieces 18 and can swing past them to nest or be disposed between the forwardmost pair of struts 20, as shown in dotted lines in FIG. 2, there being no crosspiece 26 between these struts to permit such action. The trailing end of the frame is provided with at least one wheel 42 of the caster wheel type. For greater stability, it is preferred that a caster wheel be provided at each of the rear corners of the frame.

Mounted for sliding on the frame 36 are transversely aligned angle iron members 44 disposed so that the legs of the members engage the frame side members 38, as shown in FIGS. 4 and 5. The members 44 are mounted for sliding within an angle iron housing 46 disposed transversely and secured to the frame by straps 48 and bolts 50. Alternatively, the legs of the angle iron 46 can be welded to the frame, thus dispensing with the straps and bolts. The angle members 44 are each provided with an upstanding projection 52, the projections extending through a pair of aligned slots 54 formed in one of the legs of the angle iron 46, each projection having a rounded end or knob 56. The projections or knobs are adapted to be engaged by the hand or foot of the operator for selectively sliding the members 44 to dispose the ends thereof laterally beyond the side edges of the frame 36 so as to engage under the body sidepieces 18, substantially vertically below the lower ends of a pair of struts 20, for supporting the body 14 in tilted position, as shown in FIGS. 1 and 2. A major portion load on the body is thus transmitted directly to the attachment frame.

As shown in dotted lines in FIG. 2, the attachment 10 can be swung so as to be disposed or nested wholly within the body 14. For such disposition of the attachment, the angle members 44 are manipulated to retract the ends thereof within the side edges of the attachment frame 36, as will be appreciated from viewing FIG. 3. The frame is then swung within the body and is retained therein by means of a plunger rod 58, one end 60 of which is adapted to be received in a bore 62 in the frame rear member 40, the other end of the rod having a manipulating knob 64. The rod is mounted for sliding on a pair of plates 66 suitably secured to a pair of the upper crosspieces 24. A coil spring 68 encircles the rod and reacts between one of the plates 66 and a flanged collar 70 secured on the rod so that the rod is urged to hold the distal end 60 thereof in the bore 62 for retaining the attachment in place. With the attachment so disposed, the handtruck 12 can be used in the conventional manner.

It is believed that the operation of the attachment of the present invention is clearly apparent and is briefly summarized at this point. With the attachment 10 nested within the body 14 of the handtruck 12 as shown in dotted lines in FIG. 2, the handtruck is manipulated to work the toe plate 30 under the load. The rod 58 is then manipulated to drop the attachment, after which the body is manipulated to dispose sidepieces 18 thereof above the angle members 44. The angle members are then manipulated outwardly and the body is tilted so that the sidepieces 18 are engaged thereby for supporting the body and load in a tilted position which is substantially stable and permits the operator to move the load over the ground safely with a minimum of effort.

There has thus been provided an attachment for handtrucks which has the advantage of stabilizing a load and minimizing strain so that a heavy load can be transported considerable distances safely with a minimum of effort, the attachment being of relatively simple, inexpensive and compact construction and operating with facility in a reliable manner to accomplish its purpose.

Although the present invention has been herein shown and described in considerable detail in what is believed to be the most practical and preferred embodiment thereof, it is to be understood that many variations of the embodiment are possible and that the present invention is not to be limited to such details but is to be considered in its broadest aspects and accorded the full scope of the appended claims.

Having described the invention, what is claimed and desired to be protected by Letters Patent of the United States is:

1. In a handtruck having a body supported at one end on ground wheels and tiltable thereabout; the combination of a wheeled attachment pivotally connectable to the body and having transversely movable members engageable with the body for supporting the same in a tilted position, said body including transversely spaced upper and lower sidepieces and spaced struts joined at their ends to the upper and lower sidepieces respectively, said sidepieces defining side portions with handles on the rear ends thereof, the upper sidepieces being interconnected by crosspieces to provide a load-supporting bed, mounting plates interconnecting the front ends of the sidepieces, an axle mounted on the plates having ends extending laterally beyond the side portions, said ground wheels being mounted on the axle ends, and said attachment including a frame having side members transversely spaced to fit closely within the side portions, the front ends of the frame side members being pivotally connected to the axle for swinging thereabout between a position disposing the attachment wholly within the body between the side portions thereof and a swung down position in which the rearward portion of the frame is below the lower sidepieces when the body is tilted, said transversely movable members being transversely aligned and having outer ends projectable beyond the frame side members for engaging under the lower sidepieces for supporting the body in tilted position, a transverse housing in which the movable members are housed, said housing having ends secured to the frame side members and so disposed thereon that the projecting ends of the transversely movable members engage under the lower sidepieces substantially in alignment with a pair of the struts so that a major portion of the load on the bed is transmitted directly to the attachment frame, and holding means mounted on the body engageable with the attachment frame for holding the attachment disposed wholly within the body and manipulatable for release of the attachment to swung down position.

2. The combination according to claim 1 in which said transversely aligned members are angle irons having upstanding manipulatable projections, and said housing is an angle iron disposed in covering relation to the angle irons and having slots through which the projections extend, whereby an operator of the handtruck can with one hand hold the body and with the other hand release the attachment to swing down, after which the projections can be manipulated by foot for disposing the ends of the angle irons for engagement with the lower sidepieces.

3. An attachment for a handtruck having a body with depending side portions supported at the forward ends thereof on ground wheels and tiltable between a position in which the body can rest on the ground and a position in which the body is raised from the ground, said attachment including a wheeled frame pivotally connected to the forward ends of the side portions in trailing relation thereto and swingable to a position wholly within said body between said side portions, and releasable retaining means supported on the body engageable with the frame for holding the frame positioned within the body for use of the handtruck in conventional manner, release of the retaining means permitting the frame to swing to a position in which a portion of the frame is disposed below said side portions when said body is raised from the ground, and transversely movable members mounted on said frame, said movable members being extendable laterally beyond the sides of the frame for engagement under said side portions for supporting said body in raised position and retractable for permitting the frame to be swung to the aforesaid position within the body.

4. The attachment according to claim 3 in which said frame includes side members having front ends pivotally connected close to said side portions and rear ends interconnected by a transverse rear member of slightly less length than the distance between said side portions so that the frame fits closely between the side portions, and wheels on the frame positionable therewith within said body.

5. The attachment according to claim 3 in which the movable members are mounted for sliding transversely of the frame, and upstanding means on the members engageable by an extremity of the operator of the handtruck for manipulating and moving the members while holding the body with another extremity.

6. The attachment according to claim 5 in which the movable members are transversely aligned and disposed within a transverse housing having ends secured to intermediate portions of the frame side members, said housing having slots through which said upstanding means extend.

7. The combination according to claim 6 in which said housing is an angle iron having legs disposed with the ends thereof engaging the frame side members, and said movable members are angle irons similarly disposed therewithin.

* * * * *